(12) United States Patent
Croak et al.

(10) Patent No.: US 7,773,734 B1
(45) Date of Patent: Aug. 10, 2010

(54) METHOD AND APPARATUS FOR ADVANCING A CALL SETUP SIGNALING MESSAGE

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 278 days.

(21) Appl. No.: 11/322,368

(22) Filed: Dec. 30, 2005

(51) Int. Cl.
  *H04M 15/00* (2006.01)
(52) U.S. Cl. .................. 379/112.02; 379/9.05; 379/27; 379/28; 379/221.04
(58) Field of Classification Search .................. 379/1, 379/9.05, 27, 28, 23, 112.02, 221.04; 370/352
See application file for complete search history.

(56) References Cited

U.S. PATENT DOCUMENTS

| | | | | |
|---|---|---|---|---|
| 5,933,474 A * | 8/1999 | Kipp | ................... | 379/9.05 |
| 6,570,844 B1 * | 5/2003 | Deschaine | ................... | 370/217 |
| 7,227,927 B1 * | 6/2007 | Benedyk et al. | ................... | 379/9.05 |
| 7,257,629 B2 * | 8/2007 | Manzardo | ................... | 709/224 |
| 7,423,962 B2 * | 9/2008 | Auterinen | ................... | 370/216 |
| 2003/0035414 A1 * | 2/2003 | Beyda | ................... | 370/352 |

* cited by examiner

*Primary Examiner*—Melur Ramakrishnaiah
*Assistant Examiner*—Yosef K Laekemariam

(57) ABSTRACT

A method and apparatus for enabling all network elements in a geographically diverse network to advance each call setup message that has not been processed successfully by these network elements to their identical backup network elements to attempt to advance and process the original signaling message are disclosed. In other words, the affected call setup message is advanced to an identical network element that serves as a backup to the original network element in order to advance the call establishment to minimize call failure.

14 Claims, 4 Drawing Sheets

METHOD AND APPARATUS FOR ADVANCING A CALL SETUP SIGNALING MESSAGE

The present invention relates generally to communication networks and, more particularly, to a method and apparatus for advancing a call setup signaling message to avoid call completion failures in communication networks, e.g., packet networks such as Voice over Internet Protocol (VoIP) networks.

BACKGROUND OF THE INVENTION

A VoIP network element will occasionally encounter difficulty in processing a call set up signaling message. This difficulty can be caused by error conditions in the network element and also leads to the call to fail resulting in network unreliability and customer dissatisfaction.

Therefore, a need exists for a method and apparatus for advancing a call setup signaling message to avoid call completion failures in a packet network, e.g., a VoIP network.

SUMMARY OF THE INVENTION

In one embodiment, the present invention enables all network elements in a geographically diverse network to advance each call setup message that has not been processed successfully by these network elements to their identical backup network elements to attempt to advance and process the original signaling message. In other words, the affected call setup message is advanced to an identical network element that serves as a backup to the original network element in order to advance the call establishment to minimize call failure.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
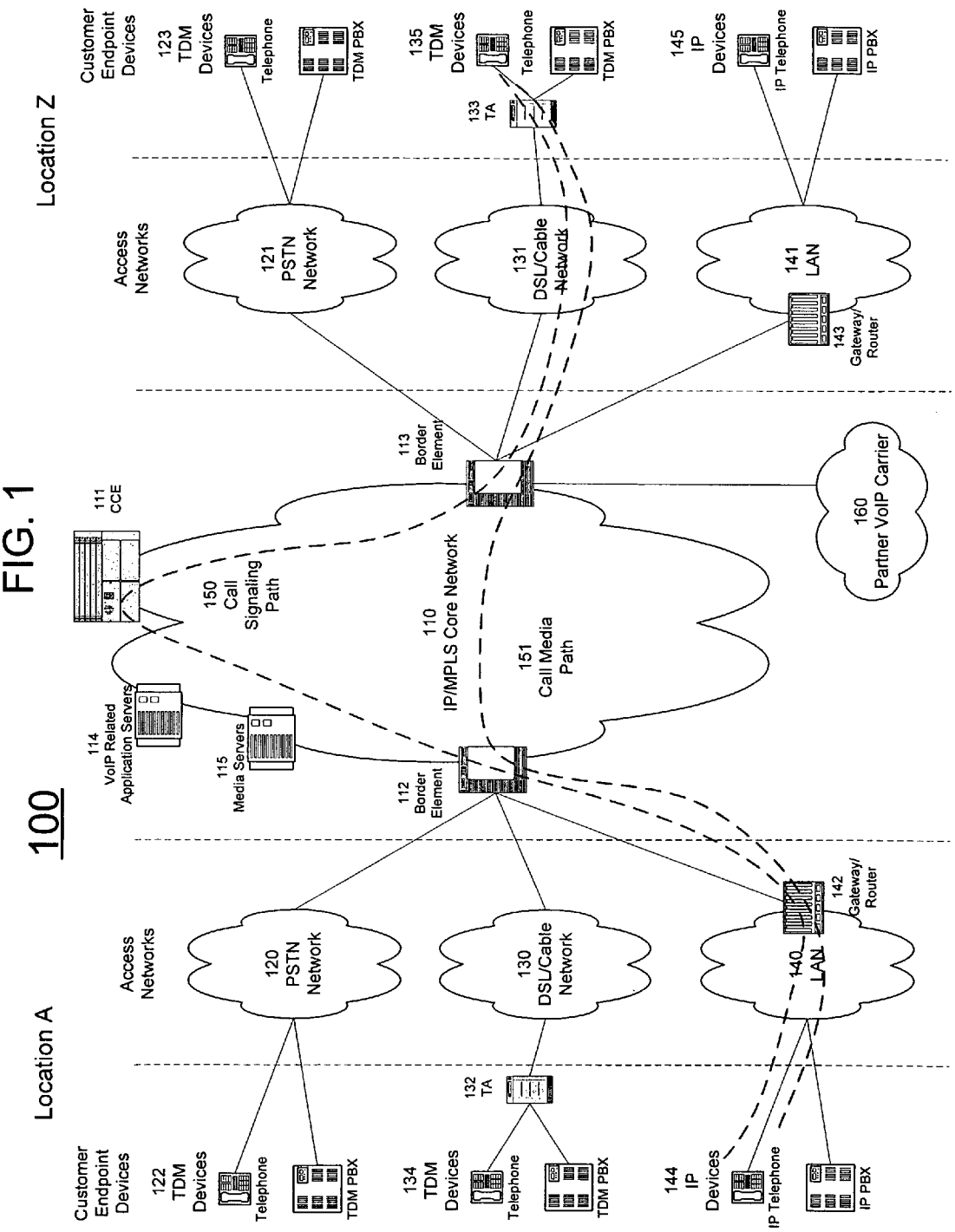
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

A VoIP network element will occasionally encounter difficulty in processing a call set up signaling message. This difficulty can be caused by error conditions in the network element and also leads to the call to fail resulting in network unreliability and customer dissatisfaction. In this case, the affected call setup message needs to be retried in an identical network element that serves as a backup to the original network element in order to advance the call establishment to minimize call failure.

To address this need, the present invention enables all network elements in a geographically diverse network to advance each call setup message that has not been processed successfully by these network elements to their identical backup network elements to attempt to advance and process the original signaling message.

Figure 2:
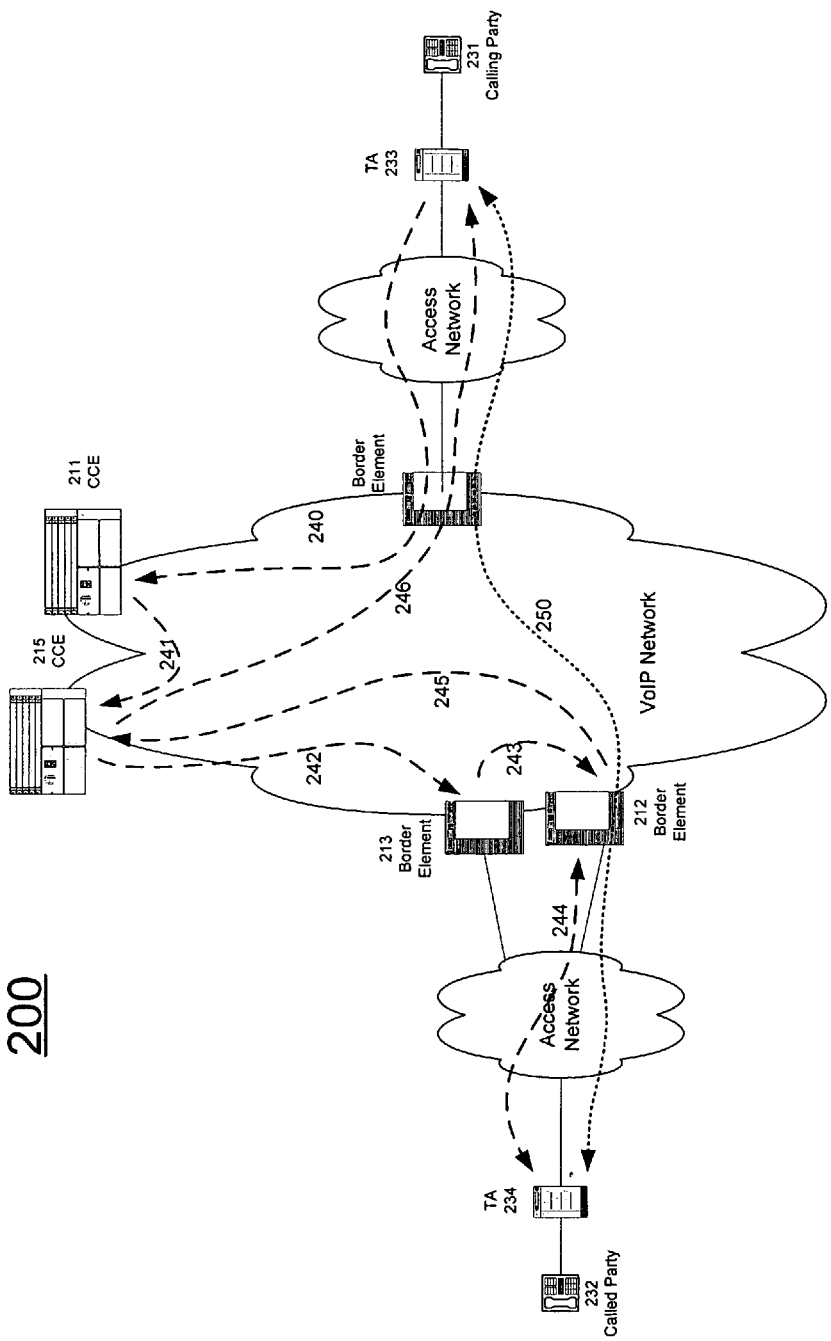
FIG. 2 illustrates an example of advancing a call setup signaling message to avoid call completion failures in a VoIP network of the present invention.

FIG. 2 illustrates an example 200 of advancing a call setup signaling message to avoid call completion failures in a packet network, e.g., a VoIP network of the present invention. In FIG. 2, CCE 215 is an identical backup network element of CCE 211 and BE 212 is an identical backup network element of BE 213. Calling party 231 places a call to called party 232. TA 233 sends a call setup message to CCE 211 using flow 240 for call processing. CCE 211 fails to process the call setup message due to an internal error condition. CCE 211, instead of failing the call, raises an alarm to warn the network operator of a call setup message fails to be processed and forwards the call to its identical backup network element CCE 215 using flow 241 in order to progress the call setup procedures. Upon receiving the call setup message, CCE 215 determines that BE 213 is the terminating BE to process the call, CCE 215 forwards the call to BE 213 using flow 242 for call processing. BE 213 fails to process the call setup message due to an internal error condition. BE 213, instead of failing the call, raises an alarm to warn the network operator of a call setup message fails to be processed and forwards the call to its identical backup network element BE 212 using flow 243 in order to progress the call setup procedures. Upon receiving the call setup message, BE 212 completes the call to TA 234 using flow 244. Called party 232 answers the call and a call acknowledgement message is sent from TA 234 to BE 212 using flow 244. BE 212 then forwards the call acknowledgement message to CCE 215 using flow 245. Upon receiving the call acknowledgement message, CCE 215 forwards the call acknowledgement message toward TA 233 using flow 246 to calling party 231. Once the call setup process has been completed, call media path 250 is established to facilitate voice media communications between calling party 231 and called party 232.

Figure 3:
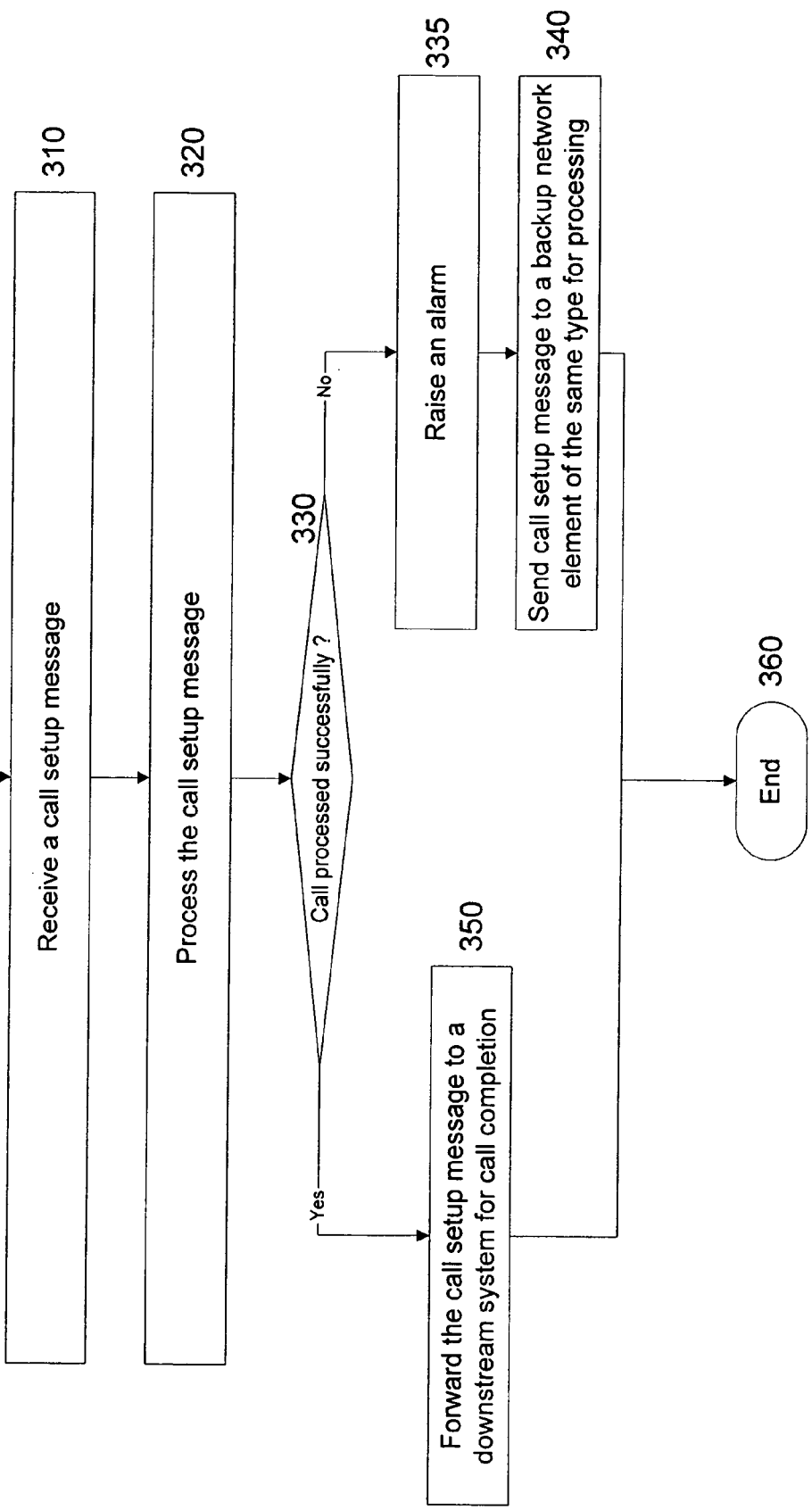
FIG. 3 illustrates a flowchart of a method for advancing a call setup signaling message to avoid call completion failures in a packet network, e.g., a VoIP network, of the present invention.

FIG. 3 illustrates a flowchart of a method 300 for advancing a call setup signaling message to avoid call completion failures in a packet network, e.g., a VoIP network, of the present invention. For example, method 300 is executed by a network element in a packet network, e.g., a VoIP network. A network element includes CCE, BE, AS, or any VoIP call processing related network elements. Method 300 starts in step 305 and proceeds to step 310.

In step 310, the method receives a call setup message. For example, the call setup message is received by a network element currently processing the call.

In step 320, the method processes the call setup message. The call setup message is processed by the current network element.

In step 330, the method checks if the call setup message is processed successfully. If the call setup message is processed successfully, then the method proceeds to step 350; otherwise, the method proceeds to step 335.

In step 335, the method raises an alarm to warn the network operator of a call setup message having failed to be processed. Namely, the call setup message fails to be processed by the current network element.

In step 340, the method sends the call setup message to an identical backup network element of the same type for call processing. For example, the call setup message is sent by the current network element to the backup network element due to an internal error of the current network element.

In step 350, the method forwards the call setup message to the next downstream network element for call completion. The call setup message is sent by the current network element to the next downstream network element. For instance, a downstream network element for an originating BE is a CCE, a downstream network element for a CCE can be a terminating BE or an AS, or a downstream element of an AS is a CCE. The method ends in step 360.

Figure 4:
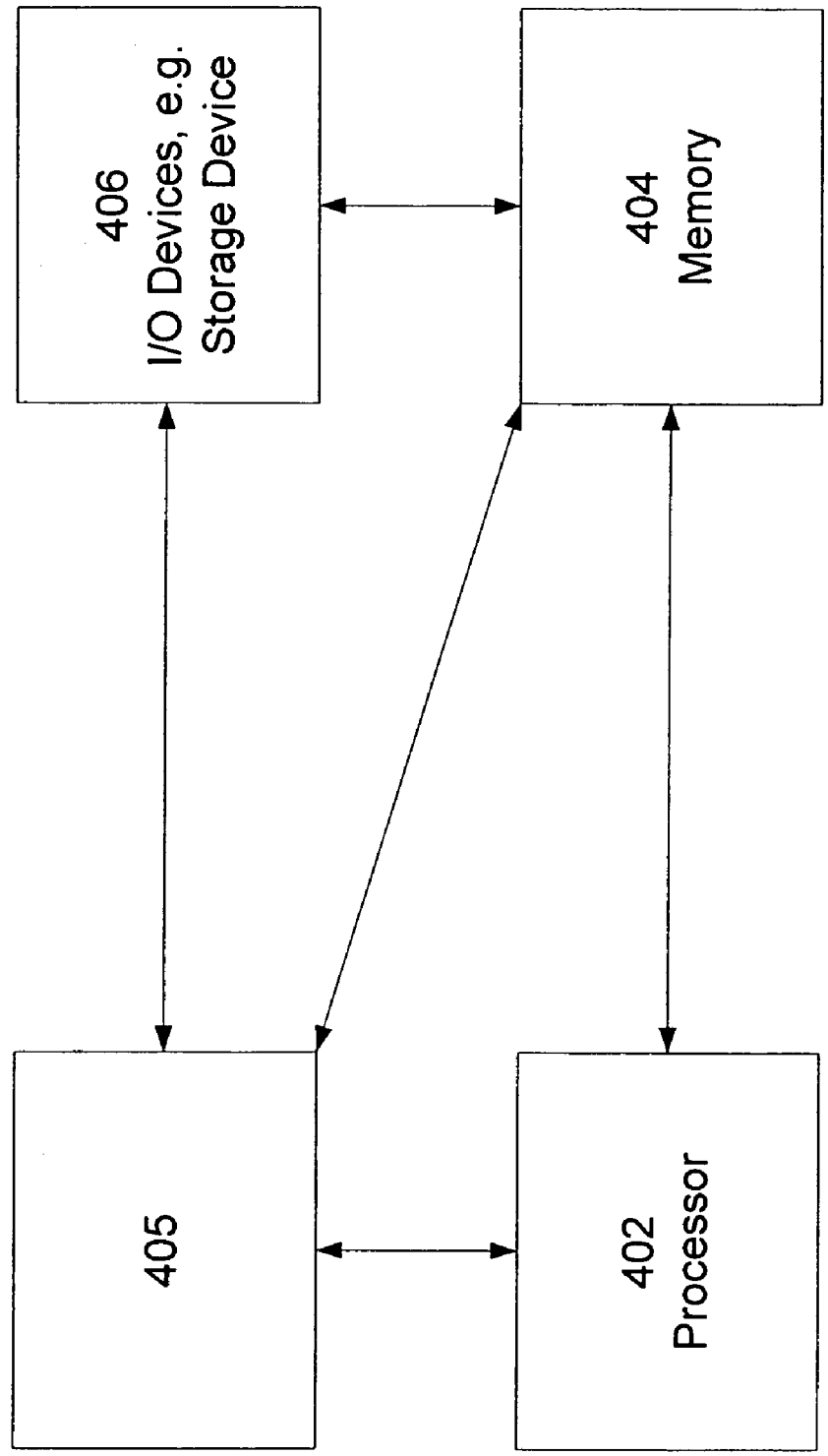
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for advancing a call setup signaling message to avoid call completion failures, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for advancing a call setup signaling message to avoid call completion failures can be loaded into memory 404 and executed by processor 402 to implement the functions as discussed above. As such, the present process 405 for advancing a call setup signaling message to avoid call completion failures (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for advancing a call setup message in a communication network, comprising:
    receiving a call setup message by a network element for processing, wherein said call setup message is not initially received by a backup network element of a same type as said network element while said network element is processing said call setup message, wherein said network element comprises a Call Control Element (CCE), a Border Element (BE), or an Application Server (AS), wherein said network element and said backup network element are physically separated;
    forwarding by said network element said call setup message to said backup network element of said same type as said network element if said call setup message fails to be processed by said network element; and
    raising an alarm by said network element to warn a network operator of said call setup message having failed to be processed by said network element.

2. The method of claim 1, wherein said communication network is a Voice over Internet Protocol (VoIP) network or a Service over Internet Protocol (SoIP) network.

3. The method of claim 1, wherein said backup network element comprises a Call Control Element (CCE), a Border Element (BE), or an Application Server (AS).

4. The method of claim 1, wherein said call setup message fails to be processed by said network element due to an internal error condition.

5. The method of claim 1, further comprising:
    forwarding said call setup message to a next downstream network element for processing if said call setup message is successfully processed by said network element.

6. The method of claim 5, wherein said next downstream network element comprises a Call Control Element (CCE), a Border Element (BE), or an Application Server (AS).

7. A computer-readable medium having stored thereon a plurality of instructions, the plurality of instructions including instructions which, when executed by a processor, cause the processor to perform steps of a method for advancing a call setup signaling message in a communication network, comprising:
    receiving a call setup message by a network element for processing, wherein said call setup message is not initially received by a backup network element of a same type as said network element while said network element is processing said call setup message, wherein said network element comprises a Call Control Element (CCE), a Border Element (BE), or an Application Server (AS), wherein said network element and said backup network element are physically separated;
    forwarding by said network element said call setup message to said backup network element of said same type as said network element if said call setup message fails to be processed by said network element; and
    raising an alarm by said network element to warn a network operator of said call setup message having failed to be processed by said network element.

8. The computer-readable medium of claim 7, wherein said communication network is a Voice over Internet Protocol (VoIP) network or a Service over Internet Protocol (SoIP) network.

9. The computer-readable medium of claim 7, wherein said backup network element comprises a Call Control Element (CCE), a Border Element (BE), or an Application Server (AS).

10. The computer-readable medium of claim 7, wherein said call setup message fails to be processed by said network element due to an internal error condition.

11. The computer-readable medium of claim 7, further comprising:
    forwarding said call setup message to a next downstream network element for processing if said call setup message is successfully processed by said network element.

12. The computer-readable medium of claim 11, wherein said next downstream network element comprises a Call Control Element (CCE), a Border Element (BE), or an Application Server (AS).

13. An apparatus for advancing a call setup signaling message in a communication network, comprising:
    a network element for receiving a call setup message, wherein said call setup message is not initially received by a backup network element of a same type as said network element while said network element is processing said call setup message, wherein said network element comprises a Call Control Element (CCE), a Border Element (BE), or an Application Server (AS), wherein said network element and said backup network element are physically separated;

wherein said network element forwards said call setup message to said backup network element of said same type as said network element if said call setup message fails to be processed by said network element; and wherein said network element raises an alarm to warn a network operator of said call setup message having failed to be processed by said network element.

14. The apparatus of claim 13, wherein said communication network is a Voice over Internet Protocol (VoIP) network or a Service over Internet Protocol (SoIP) network.

\* \* \* \* \*